United States Patent [19]
Gould et al.

[11] Patent Number: 5,271,661
[45] Date of Patent: Dec. 21, 1993

[54] CONTAINER HOLDER ARMREST

[75] Inventors: Thomas J. Gould, Zeeland; Ronald A. Dykstra, Grandville, both of Mich.

[73] Assignee: Prince Corporation, Holland, Mich.

[21] Appl. No.: 864,639

[22] Filed: Apr. 7, 1992

[51] Int. Cl.⁵ .............................................. A47C 7/62
[52] U.S. Cl. ................................... 297/194; 297/188
[58] Field of Search .............. 297/194, 188, 411, 417; 248/311.2, 314, 315

[56] References Cited

U.S. PATENT DOCUMENTS

| | | | |
|---|---|---|---|
| 3,215,467 | 11/1965 | McFarland et al. | 297/194 |
| 3,951,448 | 4/1976 | Hawie | 297/194 X |
| 4,728,018 | 3/1988 | Parker | 224/273 |
| 4,733,908 | 3/1988 | Dykstra et al. | 297/194 |
| 4,756,572 | 7/1988 | Dykstra et al. | 297/194 |
| 4,818,017 | 4/1989 | Dykstra et al. | 297/194 |
| 4,854,536 | 8/1989 | Lorence et al. | 248/311.2 |
| 4,907,775 | 3/1990 | Lorence et al. | 248/311.2 |
| 4,955,571 | 9/1990 | Lorence et al. | 248/311.2 |
| 5,060,899 | 10/1991 | Lorence et al. | 297/194 X |

FOREIGN PATENT DOCUMENTS

| | | | |
|---|---|---|---|
| 0443562 | 4/1927 | Fed. Rep. of Germany | 297/194 |
| 3432084 | 3/1986 | Fed. Rep. of Germany | 297/417 |

Primary Examiner—Kenneth J. Dorner
Assistant Examiner—Milton Nelson, Jr.
Attorney, Agent, or Firm—Price, Heneveld, Cooper, DeWitt & Litton

[57] ABSTRACT

A container holder for a vehicle is integrated in an armrest which is operably mounted adjacent a seat. The container holder is rotatably mounted to the front end and includes an aperture for receiving and holding a container. The container holder is rotatable between a use position in which the aperture faces vertically so that the aperture can operably receive and hold a container, and a second position in which a surface of the container holder mates with the top of the armrest so that a person can comfortably rest their arm on the armrest.

17 Claims, 1 Drawing Sheet

CONTAINER HOLDER ARMREST

BACKGROUND OF THE INVENTION

The present invention relates to container holders for vehicles, and in particular to a container holder integrated into an end of a vehicle armrest.

Consumers spend significant amounts of time in vehicles and as a result continue to demand innovative and non-obtrusive ways to retain drinking containers while traveling in vehicles. While many such container holders have been designed, they often require multiple and cumbersome movements to position the container holders in a use position. Further, the more complex the container holder mechanism, the more likely it is to experience mechanical failure while in service. A variety of container holders exist which can be stored in a compartment of an armrest with U.S. Pat. No. 4,792,184 being representative of such construction. For use of such container holders, typically the armrest cover must first be opened followed by movement of the container holder to a use position. This construction is somewhat difficult to incorporate in compact vehicles in which little space exists for wide armrests let alone those with storage areas sufficient for container holders. Thus, a container holder is desired which is compact and easy to position for use.

SUMMARY OF THE INVENTION

The present invention provides a container holder integrated into an end of an armrest. In a preferred embodiment, the container holder is rotatable between a first position in which a container holding aperture is positioned to operably receive and hold a container therein and a second position which forms a functional part of the armrest. In the preferred embodiment of the invention, the container holder includes a bottom support for a container holding aperture and preferably one which can be extendable to deepen the recess defined thereby to provide a more secure support for containers placed therein. Also, the container holder includes a surface that mateably aligns with a surface on the armrest to support a person's arm when in the second position.

The present invention includes many advantages over known container holders. The container holder of the present invention forms the free end of an armrest, and thus can be readily adapted into present compact automotive interior designs. Also, since the end of the armrest is typically positioned for ready access adjacent a seated person's hand, the container holder can be easily rotated between use and non-use positions. Further, the movable bottom of the preferred embodiment provides a deeper recess to receive relatively tall beverage containers such as cans and glasses. Still further, the rotating motion of the container holder can be achieved by relatively non-complex mechanisms.

These and other important objects, features, and advantages of the present invention will be further understood and appreciated by those skilled in the art by reference to the following written specification, claims, and appended drawings in which:

DETAILED DESCRIPTION OF THE PREFERRED EMBODIMENTS

Figure 2:
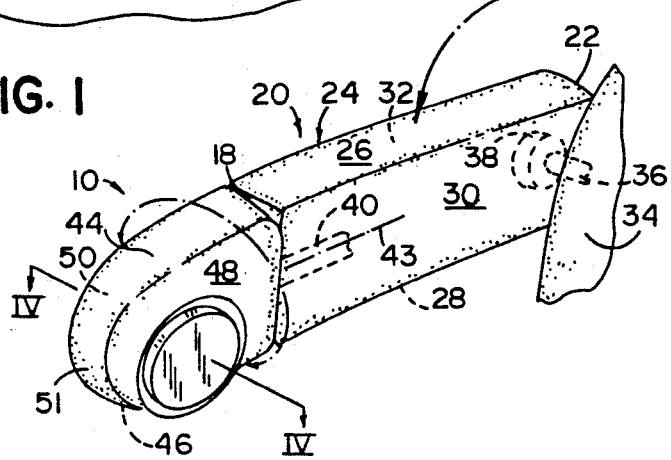
FIG. 2 is a perspective view of the container holder armrest of FIG. 1 rotated to a second use position.
Figure 3:
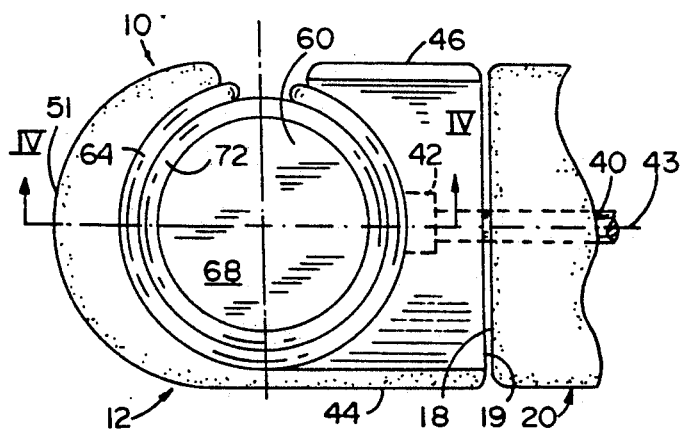
FIG. 3 is an enlarged fragmentary top plan view of the container holder armrest of FIG. 1.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific embodiment illustrated in the attached drawings, and described in the following specification is an exemplary embodiment of the inventive concepts defined in the appended claims. Hence, specific dimensions and other physical characteristics relating to the embodiment disclosed herein are not to be considered as limiting, unless the claims expressly state otherwise.

Figure 1:
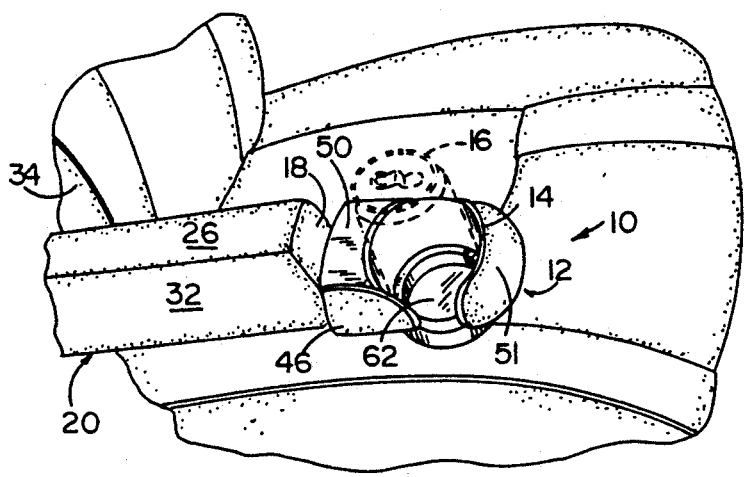
FIG. 1 is a fragmentary perspective view of a vehicle including a container holder armrest embodying the present invention shown in a first position.

A container holder armrest 10 (FIG. 1) embodying the present invention includes an armrest 20 integrally including a rotatable end member defining a container holder 12 having a container receiving recess 14 formed therein. Member 12 can be rotated between a first position as seen in FIG. 1 for holding a container 16, and a second position as seen in FIG. 2 for normal use of the integral armrest container holder. Container holder 12 is particularly shaped to mount to the free end 18 of an armrest 20, and includes outer surfaces that align with the outer surfaces of armrest 20 to provide an aesthetically pleasing and functional armrest when in the second position.

Armrest 20 (FIG. 2) is an elongated relatively narrow member having a rear end 22, a front end 18, and elongated midsection 24 defined by an upper surface 26, a bottom surface 28, an inner surface 30, and an outer surface 32 formed on a suitable core of generally conventional construction except as noted below. Armrest 20 is rotatably secured to the side of seatback 34 of a vehicle such as an automobile by pivot pin 36 which extends from seatback 34 laterally into the rear 22 of armrest 20. A bearing 38 operably receives pivot pin 36 and permits armrest 20 to rotate between a lowered horizontal position for use and a raised vertical position adjacent seatback 34. A number of different pivot mechanisms can be used to pivot armrest 20 on seatback 34, though only one is shown.

Container holder 12 (FIG. 2) is rotatably mounted to front end 18 of armrest 20 by a pivot pin 40 that extends longitudinally from within midsection 24 of the armrest forwardly of front end 18. A bearing 42 in container holder 12 operably receives pivot pin 40 and permits container holder 12 to rotate 90 degrees on a main axis 43 extending through free end 18. It is contemplated that a number of different pivot mechanisms can be used to rotatably attach container holder 12 to free end 18 of armrest 20, though only one such arrangement is shown.

Container holder 12 includes an upper surface 44, a lower surface 46, and inner surface 48 and an outer surface 50 each of which align with corresponding surfaces 26, 28, 30 and 32 on armrest 20 when container holder 12 is in the second position (FIG. 2). Container holder 12 also includes an end 51 that aesthetically joins surfaces 44, 46, 48 and 50. In particular, upper surfaces 26 and 44 form a comfortable support surface for a person's forearm when in the second position. It is contemplated that upper surfaces 26 and 44, and also the other exterior surfaces on container holder 12 and armrest 20 will be padded and covered with a trim material to maximize user comfort and also for aesthetics.

Figure 4:
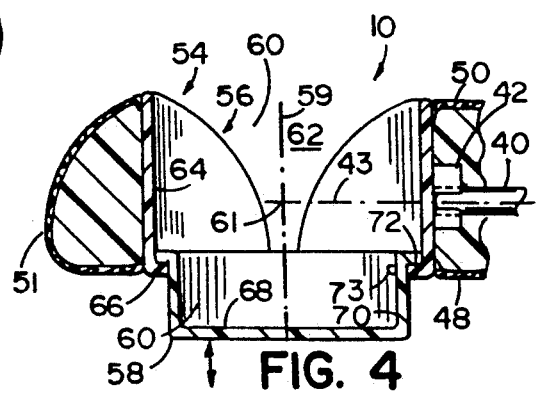
FIG. 4 is a cross-sectional view of the container holder armrest taken along section lines IV—IV of FIG. 3.

Container holder 12 (FIG. 4) includes an insert 54 with an arcuate wall 56 and a bottom support 58 that defines a recess 14 and a central axis 59. Recess 14 faces outwardly on outer surface 50 to define an aperture 60 sized to accept a variety of containers 16. Aperture 60 also includes a slot 62 that extends into lower surface 46 which is useful for receiving a mug handle (not shown).

Arcuate wall 56 (FIG. 4) includes a cylindrically shaped side 64 and a lower flange 66. Bottom support 58 includes a floor 68, a cylindrical side 70 shaped to fit within lower flange 66 of wall 56, and an upper rim 72. Bottom support 58 is slideably movable within arcuate wall 56 in the direction of central axis 59 between an extended use position (FIG. 4) wherein bottom support 58 extends from wall 56 through inner surface 48 to deepen recess 14, and a retracted storage position in which bottom support 58 is held substantially within arcuate wall 56. In the extended use position, flange 66 and rim 72 engage to securely hold bottom support 58 in place on insert 54. In the retracted storage position, floor 68 aligns with inner surface 48 to provide an aesthetic appearance. A stop or protrusion 73 extends from lower flange 66 into a slot (not shown) in side 70 of bottom support 58 to limit the movement of bottom support 58 as it is retracted into insert 54.

In the preferred embodiment, bottom support 58 is sized to receive a beverage glass or can such as container 16 (FIG. 1), while arcuate wall 56 of insert 54 is sized and shaped to receive a mug and mug handle. Also, rim 72 compliments wall 56 by being shaped to support the outer edge of the mug bottom. The core 70 of armrest 20 is of sufficient strength to support axle 40 or is suitably reinforced to support the cantilevered rotatably mounted container holder 12. A detent device (not shown) may extend between walls 18 and 19 to releasably hold the container holder 12 in the selected use positions either as a container holder as seen in FIG. 1 or as an integral part of armrest 20 as seen in FIG. 2.

In operation, when a person desires to use container holder 12, the person rotates armrest 20 to a lowered use position (FIG. 2) and rotates container holder 12 to the first position (FIG. 1) so that recess 14 is oriented vertically. A container such as container 16 can then be placed into recess 14, container 16 pushing bottom support 58 to an extended position which deepens recess 14. Optimally, main axis 43 passes through central axis 59 at a point of intersection 61 within or above recess 14 so that container holder 12 is at all times maintained adjacent and aligned with free end 18 of armrest 20. This increases the stability of container holder 12, as does the frictional engagement between free end 18 and the mating end surface 19 of container holder 12, which as described above may include a detent device. Further, this positions recess 14 and the container placed therein in a convenient location immediately adjacent the end of armrest 20 for access by a person's hand.

When finished, the person rotates container holder 12 back to the second position (FIG. 2) and presses bottom support 58 into the retracted position within the insert 54. Armrest 20 can then be used as a standard armrest, or pivoted to the raised position for storage besides seatback 34. It is contemplated that a spring (not shown) could also be used to bias bottom support 58 toward the retracted position, such as by positioning the spring between flange 66 and rim 72.

Thus, the container holder armrest of the present invention provides a compact and convenient container holder system for holding containers in a vehicle in a convenient and useable location, the container holder being aesthetically pleasing as well as functional. In the preferred embodiment of the invention, the container holder is particularly shaped and adapted to be integrally attached to the front end of an armrest which is pivotable between raised and lowered positions. It will become apparent to those skilled in the art that various modifications to the preferred embodiment of the invention can be made without departing from the spirit or scope thereof as defined by the appended claims.

The embodiments of the invention in which an exclusive property or privilege is claimed are defined as follows:

1. A container holder assembly for a vehicle comprising:
    an arm rest operably mounted adjacent a seat in the vehicle, said armrest having a rear end adapted to be supported by the seat and a front end extending from said rear end; and
    a container holder rotatably mounted to said front end of said armrest, said container holder defining an arm supporting surface and a recess including an aperture for holding a container, said container holder being rotatable about an axis between a first position in which said aperture is oriented to operably receive and hold a container therein, and a second position in which said container holder forms a functional part of said armrest with said arm supporting surface positioned for supporting a person's arm, said axis extending through said recess so that said container holder remains substantially aligned with said arm rest when in said first or second positions.

2. The apparatus as defined in claim 1 wherein said armrest includes a second arm supporting surface, said first and second arm supporting surfaces aligning to form a support surface for a person's arm when said container holder is in said second position.

3. The apparatus as defined in claim 1 wherein said container holder aligns with said front end of said armrest.

4. The apparatus as defined in claim 1 wherein the seat includes a seatback and said armrest is adapted to be rotatably mounted to the seatback for pivotal movement between a lowered use position for supporting a person's arm and a raised storage position adjacent the seatback.

5. The apparatus as defined in claim 1 wherein said container holder includes a bottom support for supporting the container placed therein.

6. The apparatus as defined in claim 2 wherein said bottom support is movable between a raised position in which said bottom support fits within said recess, and a lowered position in which said bottom support extends from said recess to deepen said recess to provide a more secure support for the container placed therein.

7. The apparatus as defined in claim 6 wherein said armrest includes a second arm supporting surface, said first and second arm supporting surfaces aligning to form a support surface for a person's arm when said container holder is in said second position.

8. The apparatus as defined in claim 7 wherein said container holder aligns with said front end of said armrest.

9. An integral container holder armrest for a vehicle comprising:
   a first elongated member including a front end and a first arm supporting surface; and
   a second member including a second arm supporting surface and a recess in said second member, said second member rotatably secured to said front end of said first member and rotable about an axis between a first position in which said recess is oriented upwardly to receive and support a container, and a second position in which said first and second arm supporting surfaces are aligned and useful for supporting a person's arm, said axis being located so as to extend through said recess so that said second member remains substantially aligned with said first member when rotated to the first position.

10. The apparatus as defined in claim 9 wherein said recess defines a cylindrical shape having a central longitudinally oriented axis, and said first axis passes through said cylindrical shape perpendicularly to said central axis.

11. The apparatus as defined in claim 9 wherein said first member forms an armrest with a supported rear end and a front end, and said second arm supporting surface aligns with said first arm supporting surface of said front end of said armrest when in said second position.

12. The apparatus as defined in claim 9 wherein said first member is adapted to be pivotally mounted to the vehicle.

13. The apparatus as defined in claim 9 wherein said recess includes a bottom support for supporting a container placed therein.

14. The apparatus as defined in claim 13 wherein said bottom support is movable between a raised position in which said bottom support fits within said recess, and a lowered position in which said bottom support extends from said recess and deepens said recess to provide a more secure support for the container placed therein.

15. A container holder assembly for a vehicle comprising:
   a container holder including a first surface with a recess therein for holding a container and further including an arm supporting surface located generally orthogonal to said first surface, said recess defining an aperture with a central axis extending normally to said first surface and further defining a bottom, means for rotatably mounting said container holder to the vehicle, said container holder being rotatable about a second axis that is perpendicular to and extends through said central axis at a point of intersection that is located in said recess, said container holder being rotatable between a first position in which said recess is oriented to receive and hold a container, and a second position in which said arm supporting surface is positioned to support a person's arm and thus form a functional part of an armrest in the vehicle.

16. The apparatus as defined in claim 15 wherein said bottom is movable between a raised position in which said bottom fits within said recess, and a lowered position in which said bottom extends from said recess and deepens said recess to provide a more secure support for the container placed therein.

17. The apparatus as defined in claim 15 wherein said container holder serves as an extension to said armrest.

* * * * *